Patented Aug. 31, 1937

2,091,573

UNITED STATES PATENT OFFICE 2,091,573

PROCESS FOR THE MANUFACTURE OF AROMATIC COMPOUNDS CONTAINING SELENIUM, NITROGEN AND SULPHUR, AND PRODUCTS PRODUCED THEREBY

Ernst Theobald, Berlin, Germany

No Drawing. Application August 20, 1935, Serial No. 37,102. In Germany August 30, 1934

8 Claims. (Cl. 260—69)

The present invention relates to the manufacture of aromatic compounds from selenic acid and benzene sulphonic acid anilide or aromatic compounds of similar constitution.

On pouring for example melted, concentrated selenic acid, obtained by fusing crystallized selenic acid ($H_2SeO_4 \cdot 2H_2O$ or $H_2SeO_4 \cdot 4H_2O$) over benzene sulphonic acid anilide, a violent reaction will take place. The benzene sulphonic acid anilide will turn greyish violet under considerable evolution of heat and the mixture will begin to boil so violently that it is flung out of the flask. However, if benzene sulphonic acid anilide is gradually introduced in small portions into the concentrated selenic acid under simultaneous cooling with ice and agitation, it will dissolve gradually, the solution turning blue. After standing for several days, for example a week, at room temperature, the mass which at the beginning is viscous will become more thinly liquid, its coloration passing to dark-brown. If the reaction mass at the end of this period is diluted with water, a brown-red solution is obtained leaving a dark-brown, selenium-containing residue. On precipitating the excess or unreacted selenic acid by barium carbonate and the dissolved barium by using potassium carbonate, concentrating the liquid to a small volume, brownish yellow fine leaves will crystallize out on cooling. If the body is crystallized with the aid of animal charcoal, magnificent, strongly refractive small leaves will form which melt at 211–212° C. under simultaneous decomposition. They are easily soluble in hot water, less soluble in cold water and insoluble in ether, alcohol and benzol. The body can be diazotized. The elementary analysis showed the following figures:

| Experimental results: | Calculated on $C_{24}H_{23}N_3SeSO_3$ |
|---|---|
| Percent | Percent |
| C : 56.40 | C : 56.25 |
| H : 4.46 | H : 4.49 |
| N : 8.25 | N : 8.39 |
| Se : 15.50 | Se : 15.43 |
| S : 6.10 | S : 6.25 |
|  | O : 9.37 |
| 90.71 | 100.18 |

It is to be inferred from the behavior of this substance towards reduction agents and from its reaction on potassium selenocyanate that the substance has the following structure:

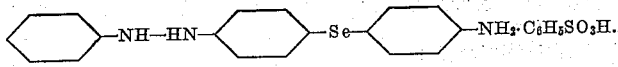

The products according to my invention are used for medical purposes. Investigations have indicated that it is useful for the treatment of malignant growths.

Example 1

5 gr. of finely powdered benzene sulphonic acid anilide ($C_6H_5NHSO_2C_6H_5$) are gradually introduced in small portions under simultaneous cooling with ice into 10 gr. of concentrated liquid selenic acid with constant stirring. For the purpose of preparing the concentrated liquid selenic acid, crystallized selenic acid is fused and the fused mass is cooled. At the beginning of the crystallization the mass is again heated to complete melting and is then allowed to cool slowly. This may be repeated, if desired. The reaction mixture is left in a closed vessel, agitating it from time to time. After being allowed to stand for about a week at room temperature the reaction mass is diluted with ¾ liter of water, at the beginning with cooling, and the non-dissolved parts are separated by filtering. The filtered solution is then mixed with prepared barium carbonate until the acid reaction to litmus paper ceases. Barium selenate is filtered off and the dissolved barium is precipitated by means of alkali metal carbonate such as potassium carbonate. After filtration the solution is evaporated until a crystalline skin begins to form on its surface; upon cooling the substance crystallizes out. The crystallized substance is then recrystallized from water with addition of some animal charcoal. From the mother liquor evaporated to dryness potassium benzene sulphonate can be produced. Instead of benzene sulphonic acid anilide other aromatic compounds of similar constitution may be used, such as sulpho-toluenic acid anilide, ethyl benzene sulphonic acid anilide or the reaction product which is obtained by reacting alpha- or beta-naphthylamine with benzene sulphonic acid chloride, and the like.

Example 2

5 parts of benzene sulphonic acid anilide are added in small portions to 10 parts of crystallized selenic acid, at room temperature. On allowing the mixture to stand, it gradually shows slightly blue coloration which will continue throughout the whole mass of crystallized selenic acid with slight evolution of heat. The color then passes to dark-brown. After 24 hours the mixture has become liquid and it shows a similar behavior as in the operation with fused selenic acid described in Example 1. The process is then continued as according to Example 1.

*Example 3*

5 gr. of benzene sulphonic acid o-toluidide are introduced in small portions to 10 gr. of concentrated liquid selenic acid, the reaction mixture preferably being cooled with ice. The introduction must by no means take place all at once, as this would result in deflagration of the mixture. After adding the anilid, the mixture is allowed to stand for some time being cooled with ice. After standing for about a week in a closed vessel the reaction mixture is diluted with ½ to ¾ liter of water and is then treated as shown in Example 1. Upon concentrating the solution a brown oil is formed which after separation from the mother liquor will solidify in the open air to a hard, brittle mass. The resulting product can be diazotized.

What I claim is:

1. Process for the manufacture of aromatic compounds containing selenium, nitrogen and sulphur, characterized by causing benzene sulphonic acid anilide to react with selenic acid, diluting the reaction mass with water after standing for several days, precipitating the unreacted selenic acid by means of barium carbonate, precipitating the dissolved barium with alkali metal carbonate, separating the precipitates by filtering the liquid and concentrating and crystallizing the filtered solution.

2. Process for the manufacture of aromatic compounds containing selenium, nitrogen and sulphur, characterized by causing benzene sulphonic acid anilide to react with fused selenic acid under simultaneous cooling, diluting the reaction mass with water after standing for several days, precipitating the unreacted selenic acid by means of barium carbonate, precipitating the dissolved barium with alkali metal carbonate, separating the precipitates by filtering the liquid and concentrating and crystallizing the filtered solution.

3. A compound having the formula

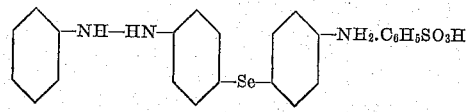

4. Process for the manufacture of aromatic compounds containing selenium, nitrogen and sulphur, characterized by causing benzene sulphonic acid anilide to react with selenic acid while preventing such a rapid rise of temperature as will permit explosive reaction to occur and allowing the reaction mass to stand until the reaction is completed.

5. An aromatic compound containing selenium, nitrogen and sulphur obtainable by the process as defined in claim 4.

6. Process for the manufacture of aromatic compounds containing selenium, nitrogen and sulphur characterized by causing benzene sulphonic acid anilide to react with liquid selenic acid at room temperature and allowing the reaction mass to stand until the reaction is completed.

7. Process for the manufacture of aromatic compounds containing selenium, nitrogen and sulphur, which comprises reacting an aryl-amide of an aryl-sulphonic acid on selenic acid while preventing such a rapid rise of temperature as will permit explosive reaction to occur and allowing the reaction mass to stand until the reaction is completed.

8. Process for the manufacture of aromatic compounds containing selenium, nitrogen and sulphur, which comprises gradually introducing benzene sulphonic acid anilide into a body of concentrated selenic acid while cooling with ice and agitating the mixture, allowing the mixture to stand for several days at room temperature, diluting the mixture with water, separating the resulting solution from solid residue, adding barium carbonate to the solution and separating the resulting precipitate, adding potassium carbonate to the solution and separating the resulting precipitate, and concentrating and cooling the resulting purified solution and recovering the resulting crystals.

ERNST THEOBALD.